July 20, 1965

A. B. EL-KAREH 3,196,246

MEANS FOR OBSERVING A WORKPIECE IN ELECTRON
BEAM MACHINING APPARATUS

Filed Nov. 29, 1962

INVENTOR.
AUGUSTE B. EL-KAREH
BY Morris A. Rabkin
Attorney

United States Patent Office 3,196,246
Patented July 20, 1965

3,196,246
MEANS FOR OBSERVING A WORKPIECE IN ELECTRON BEAM MACHINING APPARATUS
Auguste B. El-Kareh, Skillman, N.J., assignor to Radio Corporation of America, a corporation of Delaware
Filed Nov. 29, 1962, Ser. No. 240,903
8 Claims. (Cl. 219—69)

This invention relates generally to means for monitoring a manufacturing operation, and more particularly to means for observing the progress of a machining or similar operation on a workpiece in electron beam machining apparatus.

In typical electron beam machining apparatus, an intense electron beam is directed onto a workpiece to perform a machining operation on the workpiece. Depending upon the characteristics of the electron beam, the operations of cutting, drilling, welding and the like, which are called machining operations herein, may be performed upon the workpiece. It has been proposed to observe the progress of the machining operation on the workpiece by incorporating an optical system in the electron beam machining apparatus. Such prior art optical systems usually employ a mirror, a series of glass lenses, and lamps. Since the workpiece is usually confined in a relatively small, evacuated work chamber, and since X-rays are produced when the intense electron beam impinges upon the workpiece, such optical systems for monitoring purposes leave much to be desired. Furthermore, the evaporated material from the workpiece during the machining operation tends to coat the glass of the lamps, thereby decreasing the available light in the work chamber. Another difficulty with the use of lamps in the work chamber is that the glass of the lamps picks up an electric charge which tends to distort, or interfere with, the accurate positioning of the electron beam.

It is an object of the present invention to provide an improved combination of electron beam machining apparatus and visual monitoring means that substantially eliminates the aforementioned disadvantages of the prior art combination of optical means in electron beam machining apparatus.

It is another object of the present invention to provide improved means for performing an electron beam machining operation on a workpiece and means, in combination with the electron beam machining apparatus, for monitoring continuously, or at will, the progress of the machining operation.

A further object of the present invention is to provide, in combination with electron beam apparatus, visual monitoring apparatus that can be observed at a station remote from the electron beam apparatus to decrease the danger of X-ray radiation to an operator.

In accordance with the present invention, visual monitoring means are combined with electron beam machining apparatus in an improved combination by means of which the progress of a machining operation on a workpiece can be monitored continuously, or at will, during the progress of the machining operation. In a preferred embodiment of the present invention, the intensity of the electron beam performing the machining operation is varied periodically. The machining operation is performed on the workpiece by the electron beam during its higher intensity state. In its lower intensity state, the electron beam is incapable of performing the machining operation, but is still capable of producing secondary electrons at the workpiece. The electron beam performing the machining operation is positioned, or moved in accordance with a predetermined program, by suitable beam deflection means. Scanning deflection means are provided for the electron beam in its lower intensity state to scan the workpiece in the area including the site of the machining operation. A collector electrode is disposed adjacent to the workpiece to collect the secondary electrons emitted from the workpiece during the scanning period. The collector electrode is connected to visual monitoring apparatus similar to a television receiver wherein an electron beam is caused to scan a fluorescent screen of a cathode ray tube in synchronism with the electron beam that scans the workpiece, thereby providing a visual display related directly to the machining operation. If necessary, the monitoring apparatus can be blanked during the machining operation to prevent damage to the monitoring apparatus.

The novel features of the present invention, both as to its organization and method of operation, as well as additional objects and advantages thereof, will be more readily understood from the following description, when read in connection with the accompanying drawings, in which the same reference characters designate similar parts throughout, and in which.

Figure 1:
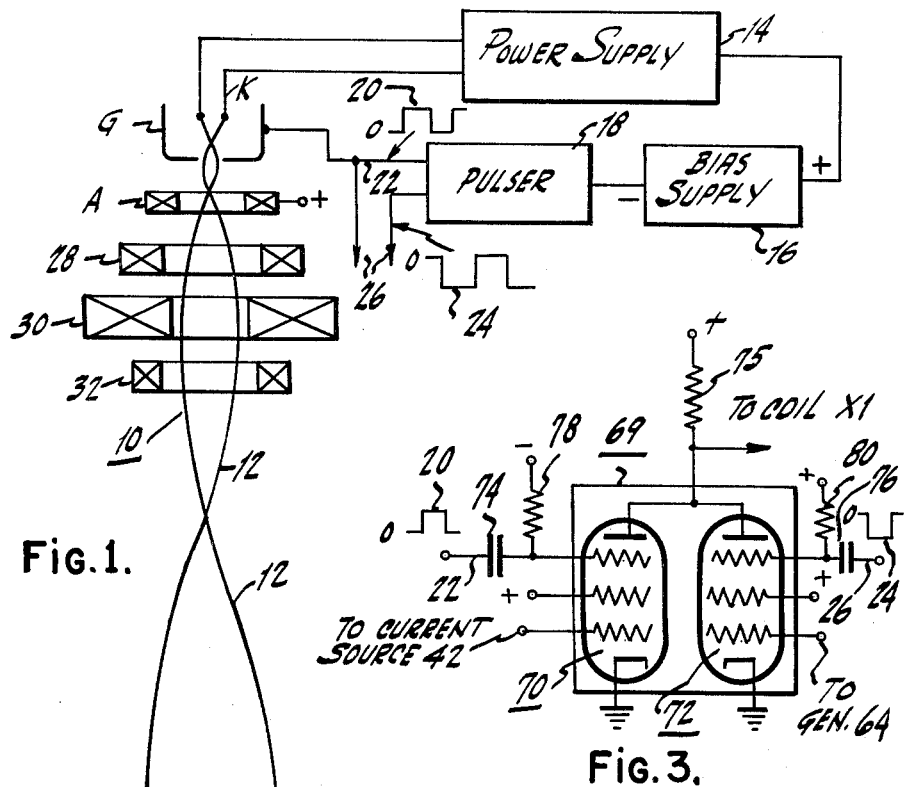
FIG. 1 is a schematic diagram, partly in block diagram form, of electron beam machining apparatus for performing a machining operation on a workpiece and for collecting secondary electrons from the workpiece in accordance with the present invention.

Referring, now, particularly to FIG. 1 of the drawings, there is shown electron beam machining apparatus 10 for producing an electron beam 12 (illustrated by its bounding trajectories) of the type adapted to perform a machining operation on a workpiece W. The electron beam 12 is produced by an electron gun comprising a cathode K, a grid G, and an anode A. The output of a filament power supply 14 is connected to the cathode K, shown herein as a directly heated cathode, but it is to be understood that an indirectly heated cathode may also be used. The power supply 14 is also connected to the positive terminal of a bias power supply 16, and the negative terminal of the latter is applied to the grid G of the electron gun through a pulser 18. The pulser 18 comprises means, such as a flip-flop circuit, for applying pulses periodically to the grid G of the electron gun to increase the intensity of the electron beam 12 periodically. The pulsed output of the pulser 18 may be of any desired duration and frequency in accordance with techniques well known in the art.

Since the pulser 18 may comprise a flip-flop circuit, pulses of opposite polarity may be derived simultaneously from its output. Substantially rectangular, positive-going pulses 20 are obtained from an output lead 22 of the pulser 18, the lead 22 being connected to the grid G of the electron gun; and substantially rectangular, negative-going pulses 24, each of the opposite polarity to a corresponding one of the pulses 20, are obtained simultaneously from an output lead 26 of the pulser 18.

In accordance with a preferred method of operation of the apparatus of the present invention, the intensity of the electron beam 12 is increased and decreased periodically. The level of the direct-current bias between the grid G and the cathode K is chosen such that the intensity of the electron beam 12 is at a level at which it is incapable of performing a machining operation on the workpiece W, but it is still sufficiently intense to produce secondary electrons at the site of the machining operation for the purpose to be explained hereinafter. When a positive-going pulse 20 is applied to the grid G of the electron gun, the intensity of the electron beam 12 is increased to a level at which it is capable of performing a machining operation on the workpiece W.

Means are provided to direct and to focus the electron beam 12 onto the workpiece W. To this end, coils 28, 30, and 32 are disposed along the path of the electron beam 12 to align and to condense the electron beam 12 in accordance with techniques well known in the art. A focusing coil F is also disposed along the path of the electron beam 12, near the workpiece W, for controlling the focusing of the beam 12 on a desired area of the workpiece W, depending upon the type of machining operation to be performed on the workpiece.

In some machining operations, it is necessary and/or desirable to move the electron beam 12 over a predetermined path on the workpiece W. A pair of X-deflection coils $X_1$ and $X_2$ and a pair of Y-deflection coils $Y_1$ and $Y_2$ (the latter coil not being shown in FIG. 1 because it is directly behind the coil $Y_1$) are provided for this purpose.

Secondary electrons emerging from the workpiece W, when the electron beam 12 impinges upon it, are collected by a positively charged collector electrode C. The collector electrode C is disposed adjacent to the workpiece W and is connected to the positive terminal of a power supply 34 through a sampling resistor 36. The negative terminal of the power supply 34 is connected to a grounded base 38 that supports the workpiece W. It will now be understood that the secondary electrons flowing through the resistor 36 produce signals thereacross which may be detected by suitable monitoring apparatus. To this end, the collector electrode C is connected to an input terminal 90 of an amplifier 40 (FIG. 4) for the purpose hereinafter appearing.

Figure 2:
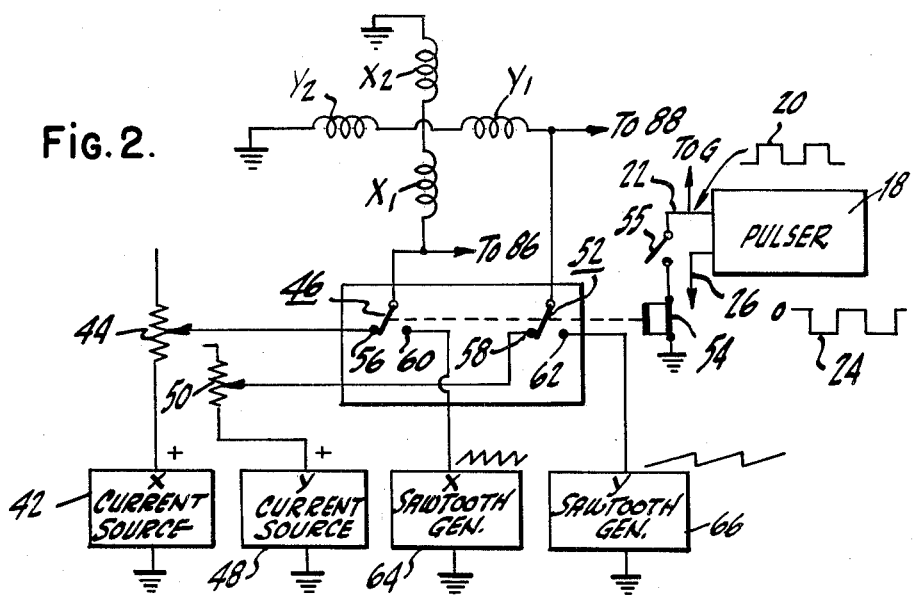
FIG. 2 is a schematic diagram, partly in block diagram form, of beam deflecting means and switching means to illustrate how the electron beam may be controlled during both machining and scanning operations in accordance with the present invention.

Referring, now, to FIG. 2 of the drawing, there are shown means for controlling the electron beam 12 during both its machining operation and its scanning operation. A source 42 of current is applied to the X-deflection coils $X_1$ and $X_2$ through a variable resistor 44 and a single-pole double-throw switch 46. Current is applied to the Y-deflection coils $Y_1$ and $Y_2$ from a current source 48 connected in series with the coils $Y_1$ and $Y_2$ through a variable resistor 50 and a single-pole double-throw switch 52. The movable arms of the switches 46 and 52 are controlled simultaneously by pulses from the pulser 18 with the aid of suitable means, such as a solenoid 54, for example. The output lead 22 of the pulser 18 is connected to ground through the solenoid 54 and a switch 55. The switch 55 may be actuated manually to operate the switches 46 and 52 at will.

During the electron beam machining operation, as when a positive-going pulse 20 is applied to the grid G of the electron gun, the solenoid 54 is actuated so that the movable arms of the switches 46 and 52 engage fixed contacts 56 and 58 of the switches 46 and 52, respectively, whereby the electron beam 12 may be deflected by current from the current sources 42 and 48. While the variable resistors 44 and 50 are illustrated diagrammatically as manual current control means for the current sources 42 and 48, it will be understood that automatic current control means, well known in the art, may also be used for deflecting the beam 12 pursuant to a predetermined program.

In the absence of pulses 20, the switches 46 and 52 are normally biased to initiate the scanning operation of the electron beam 12. Thus, in the periods between successive pulses 20, the movable arms of the switches 46 and 52 engage fixed contacts 60 and 62 of the switches 46 and 52, respectively, so as to apply current from saw-tooth generators 64 and 66 to the X-deflection coils $X_1$ and $X_2$ and to the Y-deflection coils $Y_1$ and $Y_2$, respectively. The respective frequencies of the saw-tooth generators 64 and 66 differ from each other so that the electron beam 12 is caused to scan a continuous area of the workpiece W that includes the site of the machining operation.

The switches 46 and 52, as well as the solenoid 54, are shown herein merely for the purpose of illustrating the principles of operation of the means for observing a workpiece in the electron beam machining apparatus 10. Since the usual machining operation in electron beam machining apparatus of the type described is relatively very fast, faster acting switching means for controlling the electron beam 12 are employed in actual practice.

Figure 3:
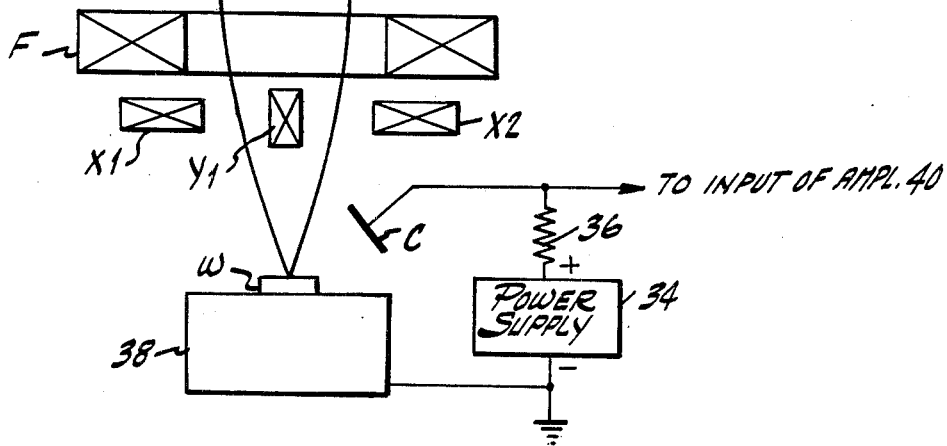
FIG. 3 is a schematic diagram of a preferred embodiment of switching means for controlling the deflection of the electron beam in the electron beam machining apparatus.

In FIG. 3, there is shown a preferred embodiment of switching means 69 for switching the electron beam 12 periodically from its machining operation to its scanning operation. The switching means 69 comprise a pair of pentode tubes 70 and 72. The anodes of the tubes 70 and 72 are connected to each other and to a source of positive potential through a common load resistor 75. The anodes of these tubes are also connected in series with the X-deflection coils $X_1$ and $X_2$. The output leads 22 and 26 from the pulser 18 are applied to the suppressor grids of the tubes 70 and 72 through coupling capacitors 74 and 76, respectively. The suppressor grid of the tube 70 is connected to a source of negative potential through a resistor 78, and the suppressor grid of the tube 72 is connected to a source of positive potential through a resistor 80. The screen grids of the tubes 70 and 72 are connected to a suitable source of positive potential in a manner well known in the art. The output of the current source 42 is applied to the control grid of the tube 70, and the output of the saw-tooth generator 64 is applied to the control grid of the tube 72. The cathodes of both tubes 70 and 72 are grounded.

In operation, the tubes 70 and 72 are rendered conductive periodically and alternately by the pulses 20 and 24 from the pulser 18. At any instant, the suppressor grid of one tube is of one polarity when the suppressor grid of the other tube is of the opposite polarity. Thus, current from the current sources 42 and 64 is supplied to the X-deflection coils $X_1$ and $X_2$ alternately to perform the machining and scanning operations sequentially.

Current from the current sources 48 and 66 is supplied to the Y-deflection coils $Y_1$ and $Y_2$ alternately in the same manner as current is supplied to the X-deflection coils $X_1$ and $X_2$ from the current sources 42 and 64. Since the circuit for doing this is similar to that of FIG. 3, it is not illustrated herein.

Figure 4:
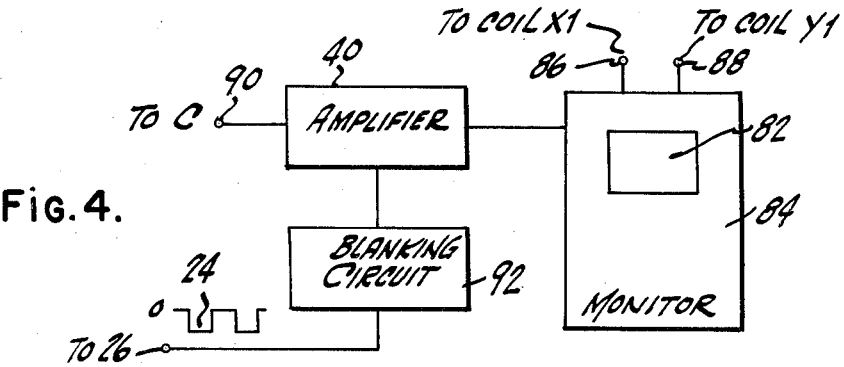
FIG. 4 is a schematic diagram, in block diagram form, of the visual display apparatus of the monitoring system of the present invention.

Referring, now, to FIG. 4, there is shown monitoring apparatus for displaying an image of the area of the scanned workpiece W on a screen 82 of a monitor 84. The monitor 84 is essentially a television receiver that has X- and Y-deflection coils (not shown) substantially similar to the coils $X_1$ and $X_2$, and $Y_1$ and $Y_2$, respectively. The deflection coils in the monitor 84 may be supplied with current from the saw-tooth generators 64 and 66 by connecting respective ends of the coils $X_1$ and $Y_1$ to input terminals 86 and 88 of the monitor's deflection coils, thereby synchronizing the electron beam in the monitor 84 with the electron beam 12 in the electron beam machining apparatus 10.

Signals developed across the sampling resistor 36 (FIG. 1) by the secondary electrons collected by the collector electrode C are applied to the input terminal 90 of the amplifier 40 (FIG. 4). Since the collector electrode C also collects secondary electrons in large concentrations during the machining operation, it may be desirable to blank the amplifier 40 during this period for protective purposes. To this end, the output lead 26 from the pulser 18 is connected to a blanking circuit 92. The output from the blanking circuit 92 is connected to the amplifier 40 in a manner whereby the amplifier is blanked during the machining operation. The blanking circuit 92 may be a flip-flop circuit whose output is applied to the amplifier 40 to blank the latter in a manner well known in the art. The output of the amplifier 40 is applied to the signal input of the monitor 84 for controlling the intensity of the electron beam therein. The blanking circuit 92 and the amplifier 40 may be a part of the monitor 84 and enclosed within the same housing or cabinet.

A preferred method of observing the progress of the workpiece W during a machining operation is to vary the intensity of the electron beam 12 periodically so that the machining operation and the scanning operation for visualizing the machining operation are performed alternately. Pulses from the pulser 18 control these operations. When a positive-going pulse 20 is applied to the grid G of the electron gun, and to the suppressor grid of the tube 70 to cause the electron beam 12 to perform a machining operation on the workpiece W, a negative-going pulse 24 is applied simultaneously to the blanking circuit 92 for blanking the amplifier 40. Under these conditions, no image appears upon the screen 82 of the monitor 84. In the absence of a positive-going pulse 20 to the grid G of the electron gun and to the suppressor grid of the tube 70, and in the simultaneous absence of a negative-going pulse 24 to the suppressor grid of the tube 72 in the switching circuit 69, the tube 72 is rendered conductive and the saw-tooth generators 64 and 66 are connected to the deflection coils $X_1$, $X_2$, $Y_1$ and $Y_2$ for scanning an area of the workpiece W that includes the site of the machining operation.

Figure 5:
FIGS. 5 and 6 are views showing examples of visual displays of a workpiece that can be obtained by visual display apparatus according to the present invention.
Figure 6:

Current resulting from the secondary electrons that are collected by the collector electrode C develops signals across the resistor 36, and these signals are applied to the input 90 of the amplifier 40 for controlling the electron beam in the monitor 84. Since the electron beam in the monitor 84 is controlled by deflection coils similar to those that control the electron beam 12, and since the monitor's deflection coils can be synchronized by current from the saw-tooth generators 64 and 66, a raster image can be produced on the screen 82 that is representative of the scanned area of the workpiece W. If, for example, the machining operation on the workpiece W is that of drilling a hole in the workpiece W, the scanned image produced on the screen 82 may appear as a light spot on a dark background, as shown in FIG. 5. If desired, a negative image, that is, a dark spot on a light background, can be placed on the screen 82 of the monitor 84 by techniques known in the television art. Such a negative image of a hole in the workpiece W is illustrated in FIG. 6.

From the foregoing description, it will be apparent that there has been provided improved means for observing the progress of work done upon a workpiece by an electron beam in electron beam machining apparatus. While some of the circuitry of the present invention has been illustrated in diagrammatic form, various components useful therein, as well as variations in the apparatus itself coming within the spirit of this invention, will, no doubt, readily suggest themselves to those skilled in the art. For example, instead of controlling the electron beam to perform machining and scanning operations alternately, it may be desirable to perform each operation at will. Hence, it is desired that the foregoing shall be considered as illustrative and not in a limiting sense.

What is claimed is:

1. In apparatus of the type wherein an electron beam from an electron gun is directed onto a workpiece to perform a machining operation on said workpiece, the combination therewith of
    (a) means for biasing said gun to develop a current intensity for said beam periodically sufficient to perform said machining operation,
    (b) means for biasing said gun periodically to reduce the current intensity of said beam so that it is substantially incapable of performing said machining operation but is capable of producing secondary electrons at said workpiece,
    (c) means to scan said workpiece with said beam of reduced intensity current at the site of said machining operation,
    (d) means to collect said secondary electrons produced by said beam of reduced intensity current and to derive signals therefrom,
    (e) visual display apparatus having an electron beam,
    (f) means to deflect said electron beam of said visual display apparatus with said means to scan said workpiece, and
    (g) means to apply said signals to said visual display apparatus to observe the progress of said machining operation.

2. In electron beam machining apparatus of the type wherein an electron beam is directed onto a workpiece to perform a machining operation thereon, the combination therewith of
    (a) bias means,
    (b) pulsing means connected to said bias means to increase periodically the current intensity of said beam to perform said machining operation and to decrease during each period the current intensity of said beam to a level where it is incapable of substantially performing said machining operation but is capable of producing secondary electrons,
    (c) means to scan with said beam of decreased intensity current an area of said workpiece including the site of said machining operation,
    (d) means to collect said secondary electrons and to produce signals therefrom,
    (e) visual display apparatus having an electron beam,
    (f) means to deflect said beam of said visual display apparatus in synchronism with the scanning with said beam of decreased intensity current, and
    (g) means to apply said signals to said visual display apparatus to monitor the progress of said machining operation.

3. In electron beam machining apparatus of the type wherein a beam of electrons is directed onto a workpiece for performing a machining operation thereon, in combination,
    (a) means to increase and to decrease the intensity of said electron beam periodically, said beam being incapable of substantially performing said machining operation when its intensity is decreased periodically but is capable of producing secondary electrons at said workpiece,
    (b) means to position said beam in its increased intensity state for said machining operation,
    (c) means to scan an area of said workpiece including the site of said machining operation with said beam in its decreased intensity state,
    (d) a collector electrode adjacent to said workpiece,
    (e) means to bias said collector electrode to collect said secondary electrons and to produce signals therefrom,
    (f) visual display apparatus, and
    (g) means to apply said signals to said visual display apparatus to monitor the progress of said machining operation.

4. In electron beam machining apparatus of the type wherein a beam of electrons is directed onto a workpiece for performing a machining operation thereon, in combination,
    (a) means to bias said electron beam to an intensity such that it is capable of producing secondary electrons at said workpiece but is substantially incapable of performing a machining operation on said workpiece,
    (b) means to increase the intensity of said electron beam periodically to perform said machining operation on said workpiece, (c) deflection coils disposed to deflect said electron beam,
(d) first current means and second current means,
(e) switching means,
(f) means connecting said first and said second current means alternately to said deflection coils through said switching means in response to said means to increase the intensity of said electron beam,
(g) a collector electrode disposed adjacent to said workpiece to collect said secondary electrons,
(h) visual display means, and
(i) means connecting said collector electrode to said visual display means.

5. In electron beam machining apparatus of the type wherein a beam of electrons is directed onto a workpiece for performing a machining operation thereon, in combination,
(a) means to bias said electron beam to an intensity such that it is capable of producing secondary electrons at said workpiece but is substantially incapable of performing a machining operation on said workpiece,
(b) means to increase the intensity of said electron beam periodically to perform said machining operation on said workpiece,
(c) deflection coils disposed to deflect said electron beam,
(d) first current means and second current means, said second current means comprising means to cause said electron beam to scan an area of said workpiece.
(e) switching means,
(f) means connecting said first and said second current means alternately through said switching means in response to said means to increase the intensity of said electron beam,
(g) a collector electrode disposed adjacent to said workpiece to collect said secondary electrons,
(h) visual display means having beam deflection means substantially similar to said deflection coils,
(i) means to apply said second current means to said beam deflection means, and
(j) means connecting said collector electrode to said visual display means.

6. In electron beam machining apparatus of the type wherein a beam of electrons is directed onto a workpiece for performing a machining operation thereon, in combination,
(a) means to bias said electron beam to an intensity such that it is capable of producing secondary electrons at said workpiece but is substantially incapable of performing a machining operation on said workpiece,
(b) means to vary said bias means periodically to increase the intensity of said electron beam periodically to perform said machining operation on said workpiece periodically,
(c) deflection coils disposed to deflect said electron beam,
(d) first current means and second current means, said second current means comprising means to cause said electron beam to scan an area of said workpiece including the site of said machining operation,
(e) switching means,
(f) means connecting said first and said second current means alternately to said deflection coils through said switching means,
(g) a collector electrode disposed adjacent to said workpiece to collect said secondary electrons,
(h) visual display means having beam deflection means substantially similar to said deflection coils,
(i) means to apply said second current means to said beam deflection means in synchronism with said switching means,
(j) means connecting said collector electrodes to said visual display means, and
(k) means to blank said visual display means during said machining operation.

7. A method of visualizing, with the aid of a television monitor, the progress of a machining operation performed on a workpiece by an electron beam, said method comprising the steps of
(a) varying the intensity of said electron beam alternately between two levels of intensity, said beam at one of said levels being of sufficient intensity to perform said machining operation and at the other of said levels being incapable of performing said machining operation but being of sufficient intensity to produce secondary electrons at said workpiece.
(b) scanning the area of said workpiece including the site of said machining operation with said electron beam at said other level of intensity,
(c) collecting said secondary electrons,
(d) developing signals from said secondary electrons,
(e) scanning said television monitor synchronously with the scanning of said beam, and
(f) applying said signals to said television monitor.

8. A method of visualizing, with the aid of a television monitor having a cathode ray beam, the progress of a machining operation performed on a workpiece by an electron beam, said method comprising the steps of
(a) varying the intensity of the electron beam alternately between two levels of intensity such that said beam at one of said levels is of sufficient intensity to perform said machining operation and at the other of said levels is incapable of performing said machining operation but is of sufficient intensity to produce secondary electrons at said workpiece,
(b) scanning the area of said workpiece including the site of said machining operation with said electron beam at said other level of intensity,
(c) collecting said secondary electrons,
(d) developing signals from said secondary electrons,
(e) scanning the screen of said monitor with said cathode ray beam synchronously with the scanning of said area of said workpiece with said electron beam,
(f) applying said signals to said monitor to produce an image on said screen of said area, and
(g) blanking said monitor during said machining operation.

References Cited by the Examiner
UNITED STATES PATENTS

| | | | |
|---|---|---|---|
| 3,016,449 | 1/62 | Steigerwald | 219—117 |
| 3,103,584 | 9/63 | Shapiro et al. | 250—49.5 |

OTHER REFERENCES

"An Improved Scanning Electron Microscope for Opaque Specimens," McMullan, Institution of Electrical Engineers, vol. 100, 1953, pages 245–255 relied on.

RICHARD M. WOOD, *Primary Examiner*.

JOSEPH V. TRUHE, SR., *Examiner*.